(12) United States Patent
Osawa et al.

(10) Patent No.: US 12,162,084 B2
(45) Date of Patent: Dec. 10, 2024

(54) ROTARY CUTTING TOOL

(71) Applicant: OSG CORPORATION, Toyokawa (JP)

(72) Inventors: Jiro Osawa, Toyokawa (JP); Tomonori Yoda, Toyokawa (JP); Yusuke Tanaka, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 488 days.

(21) Appl. No.: 17/606,376

(22) PCT Filed: May 22, 2019

(86) PCT No.: PCT/JP2019/020361
§ 371 (c)(1),
(2) Date: Oct. 25, 2021

(87) PCT Pub. No.: WO2020/235069
PCT Pub. Date: Nov. 26, 2020

(65) Prior Publication Data
US 2022/0250176 A1 Aug. 11, 2022

(51) Int. Cl.
*B23C 5/28* (2006.01)
(52) U.S. Cl.
CPC .............. *B23C 5/282* (2022.02); *B23C 5/281* (2022.02); *B23B 2231/0264* (2013.01)
(58) Field of Classification Search
CPC .............. B23B 51/0682; B23B 51/068; B23B 51/0686; B23B 51/06; B23B 31/005;
(Continued)

(56) References Cited

U.S. PATENT DOCUMENTS 5,085,540 A * 2/1992 Pagliaccio ................ B23C 5/28
407/57
5,378,091 A 1/1995 Nakamura
(Continued)

FOREIGN PATENT DOCUMENTS

| CN | 101678476 A | 3/2010 |
|----|-------------|--------|
| CN | 202356665 U | 8/2012 |

(Continued)

OTHER PUBLICATIONS

Jul. 30, 2019 International Search Report issued in International Patent Application No. PCT/JP2019/020361.
(Continued)

*Primary Examiner* — Alan Snyder
(74) *Attorney, Agent, or Firm* — Oliff PLC

(57) ABSTRACT

A rotary cutting tool includes: a blade portion; a shank portion having a diameter larger than a diameter of the blade portion; and a tapered connecting portion connecting the blade portion and the shank portion. The shank portion includes a plurality of coolant-guide recessed grooves provided in its outer circumferential surface. Each of the coolant-guide recessed grooves has a groove depth and a groove width that is larger than the groove depth. Each of the coolant-guide recessed grooves has a groove bottom that is shaped such that the groove depth is reduced as the each of the coolant-guide recessed grooves extends from its start end toward a groove-depth regional-change position in which a tendency of change of the groove depth is changed.

11 Claims, 6 Drawing Sheets

(58) Field of Classification Search
CPC . B23B 2231/0264; B23C 5/281; B23C 5/282; B23C 5/28
See application file for complete search history.

(56) References Cited

U.S. PATENT DOCUMENTS

| | | | |
|---|---|---|---|
| 2003/0095841 A1* | 5/2003 | Kraemer | B23C 5/28 408/230 |
| 2010/0086373 A1 | 4/2010 | Kleiner | |
| 2010/0143055 A1 | 6/2010 | Kleiner et al. | |

FOREIGN PATENT DOCUMENTS

| | | | |
|---|---|---|---|
| CN | 205362807 U | | 7/2016 |
| CN | 107824884 A | | 3/2018 |
| DE | 4019428 A1 * | | 1/1992 |
| JP | H01-132327 U | | 9/1989 |
| JP | H06-134648 A | | 5/1994 |
| JP | H10-225814 A | | 8/1998 |
| JP | 3154847 U | | 10/2009 |
| JP | 2010-527798 A | | 8/2010 |
| JP | 2010-527799 A | | 8/2010 |
| JP | 2014-058035 A | | 4/2014 |

OTHER PUBLICATIONS

Jul. 30, 2019 Written Opinion of the International Searching Authority issued in International Patent Application No. PCT/JP2019/020361.
Jun. 23, 2022 Office Action issued in Indian Patent Application No. 202117056843.
Aug. 25, 2023 Office Action issued in Chinese Patent Application No. 201980096063.2.

* cited by examiner

ROTARY CUTTING TOOL

TECHNICAL FIELD

The present invention relates to a rotary cutting tool including guide grooves for guiding a coolant, and more particularly, to a technique for efficiently cooling a cutting edge so as to suppress progress of cutting-edge wear, without reducing rigidity of the rotary cutting tool.

BACKGROUND ART

A rotary cutting tool, which is provided with a blade portion having a relatively small diameter of, for example, 10 mm or less, includes a shank portion having a diameter larger than the diameter of the blade portion. Since such a rotary cutting tool is driven and rotated at a relatively high speed, wear of cutting edge of the blade portion is large. For suppressing progress of the cutting-edge wear, a coolant is supplied to the cutting edge of the blade portion through the shank portion so as to cool the cutting edge. A milling tool disclosed in Patent Document 1 is an example of such a rotary cutting tool.

In the disclosed milling tool, a coolant guide hole is provided to extend through the shank portion in a direction of its rotary axis, and the coolant is supplied toward the blade portion from an outlet of the coolant guide hole, wherein the outlet is provided in a tapered connecting portion connecting the shank portion and the blade portion. With the coolant being supplied to the blade portion, the cutting edge of the blade portion is cooled and cutting chips generated in a cutting operation are discharged.

PRIOR ART DOCUMENT

Patent Document

Patent Document 1:
Japanese Unexamined Patent Application Publication No. 2014-058035

DISCLOSURE OF THE INVENTION

Object to be Achieved by the Invention

By the way, there is a case in which the rotary cutting tool is required to be rotated at a higher speed and the coolant is required to be supplied at a higher rate, for increasing cutting efficiency. However, in the above-described conventional rotary cutting tool, if a cross sectional area of the coolant guide hole passing through the shank portion is increased, rigidity of the shank portion would be reduced. Thus, since the cross sectional area of the coolant guide hole is limited, the supply of the coolant is limited due to resistance to flow of the coolant in the coolant guide hole, so that there is a case in which it is difficult to supply the coolant to the cutting edge at a sufficient rate. Such an inconvenience is more pronounced where the diameter of the blade portion of the rotary cutting tool is small.

On the other hand, if the diameter of the shank portion is increased, the coolant, which is discharged from the outlet of the coolant guide hole straightly passing through the shank portion, would be applied toward a position distant from the cutting edge, and a peripheral speed of the blade portion would be reduced, so that there are inconveniences such as progress of the cutting-edge wear and reduction in the cutting efficiency.

The present invention was made in view of the background discussed above. It is therefore an object of the present invention to provide a rotary cutting tool in which a coolant can be supplied to a cutting edge at a sufficient rate so that progress of cutting-edge wear is suppressed and cutting efficiency is obtained.

Various experiments and studies made by the inventors of the present invention and their collaborators under the above-described situation revealed a fact that the coolant can be supplied at a sufficient rate from the shank portion to the blade portion, without considerably reducing the rigidity of the shank portion, by using, as passages of the coolant in the shank portion, grooves provided in an outer circumferential surface of the shank portion. The present invention was made based on the revealed fact.

Measures for Solving the Problem

That is, the gist of the present invention is that, (a) in a rotary cutting tool comprising: a blade portion includes a cutting edge provided in the blade portion; a shank portion having a diameter larger than a diameter of the blade portion; and a tapered connecting portion connecting the blade portion and the shank portion, (b) the shank portion includes a plurality of coolant-guide recessed grooves which are provided in an outer circumferential surface of the shank portion and which are circumferentially spaced apart from each other, such that a start end of each of the coolant-guide recessed grooves is located in an end surface of the shank portion, and such that a terminal end of each of the coolant-guide recessed grooves is located in a tapered outer circumferential surface of the connecting portion, and (c) each of the coolant-guide recessed grooves has a flat groove cross section such that a groove width of each of the coolant-guide recessed grooves is larger than a groove depth of each of the coolant-guide recessed grooves, each of the coolant-guide recessed grooves being configured to guide a coolant from the shank portion to the connecting portion.

Effects of the Invention

In the rotary cutting tool according to the present invention, the shank portion includes the plurality of coolant-guide recessed grooves which are provided in the outer circumferential surface of the shank portion and which are circumferentially spaced apart from each other, such that the start end of each of the coolant-guide recessed grooves is located in the end surface of the shank portion, and such that the terminal end of each of the coolant-guide recessed grooves is located in the tapered outer circumferential surface of the connecting portion, wherein each of the coolant-guide recessed grooves has the flat groove cross section such that the groove width is larger than the groove depth, and wherein each of the coolant-guide recessed grooves is configured to guide the coolant from the shank portion to the connecting portion. As compared with a case in which a coolant guide hole is provided to pass through the shank portion, it is possible to supply the coolant at a sufficient rate so as to suppress progress of cutting-edge wear and obtain cutting efficiency, without considerably increasing a diameter of the shank portion and without considerably reducing rigidity of the shank portion.

Preferably, the blade portion includes a peripheral cutting-edge portion provided in an outer circumferential surface of the blade portion and an end cutting-edge portion provided in an end surface of the blade portion. Owing to this arrangement, the coolant flowing out of each of the coolant-guide recessed grooves through the terminal end is moved along the tapered outer circumferential surface of the connecting portion toward the peripheral cutting-edge portion and the end cutting-edge portion of the blade portion, so that it is possible to supply the coolant to the peripheral cutting-edge portion and the end cutting-edge portion at a sufficient rate so as to suppress progress of cutting-edge wear and obtain cutting efficiency.

Further, preferably, the groove width of each of the coolant-guide recessed grooves is constant, and the coolant-guide recessed grooves are provided to occupy 50% or less of the outer circumferential surface of the shank portion. Since each of the coolant-guide recessed grooves has the constant groove width, a turbulence is unlikely to occur in the coolant that is guided by the coolant-guide recessed grooves. Therefore, the coolant flowing out of each of the coolant-guide recessed grooves through the terminal end is moved along the tapered outer circumferential surface of the connecting portion toward the peripheral cutting-edge portion and the end cutting-edge portion of the blade portion, so that it is possible to supply the coolant to the blade portion at a sufficient rate so as to suppress progress of cutting-edge wear and obtain cutting efficiency.

Further, preferably, the plurality of coolant-guide recessed grooves consist of three, four, five or six coolant-guide recessed grooves. Owing to this arrangement, it is possible to suppress reduction in centering accuracy of the rotary cutting tool and reduction in rigidity of the shank portion. If the number of the coolant-guide recessed grooves is not larger than two, the centering accuracy of the rotary cutting tool would be reduced. If the number of the coolant-guide recessed grooves is not smaller than seven, resistance to flow of the coolant would be increased thereby making it impossible to supply the coolant at a sufficient rate.

Further, preferably, each of the coolant-guide recessed grooves has a groove bottom shape such that the groove depth is reduced (namely, a distance from a rotary axis is increased) as the each of the coolant-guide recessed grooves extends from the start end toward a groove-depth regional-change position in which a tendency of change of the groove depth is changed. That is, on a downstream side of the groove-depth regional-change position in each of the coolant-guide recessed grooves, the coolant flowing in the each of the coolant-guide recessed grooves forms a laminar flow having a flat cross section whose thickness in a radial direction of the rotary cutting tool is limited, so that the coolant flowing out of each of the coolant-guide recessed grooves through the terminal end is moved along the tapered outer circumferential surface of the connecting portion toward the blade portion, thereby making it possible to supply the coolant to the cutting edge of the blade portion at a sufficient rate and accordingly to suppress progress of the cutting-edge wear and obtain the cutting efficiency.

Further, preferably, a groove bottom of each of the coolant-guide recessed grooves has a polyline shape or an arc shape that has a predetermined radius of curvature, in the groove-depth regional-change position. Owing to this arrangement, a turbulence is unlikely to occur in the coolant flowing in the coolant-guide recessed grooves when the coolant passes through the groove-depth regional-change position. Therefore, the coolant flowing out of each of the coolant-guide recessed grooves through the terminal end is moved along the tapered outer circumferential surface of the connecting portion toward the blade portion, so that it is possible to supply the coolant to the cutting edge of the blade portion at a sufficient rate so as to suppress progress of the cutting-edge wear and obtain the cutting efficiency.

Further, preferably, a distance from a rotary axis of the rotary cutting tool to the groove bottom of each of the coolant-guide recessed grooves is constant or gradually reduced, as the each of the coolant-guide recessed grooves extends from the groove-depth regional-change position toward the terminal end. Owing to this arrangement, the turbulence is unlikely to occur in the coolant in the coolant-guide recessed grooves when the coolant flows from the groove-depth regional-change position toward the terminal end. Therefore, the coolant flowing out of each of the coolant-guide recessed grooves through the terminal end is moved along the tapered outer circumferential surface of the connecting portion toward the blade portion, so that it is possible to supply the coolant to the cutting edge of the blade portion at a sufficient rate so as to suppress progress of the cutting-edge wear and obtain the cutting efficiency.

Further, preferably, a groove bottom of each of the coolant-guide recessed grooves in at least a portion thereof ranging from the start end to the groove-depth regional-change position, has a straight-line shape having a constant gradient, or has an arc shape that has a predetermined radius of curvature whose center lies on a plane containing a rotary axis of the rotary cutting tool and a widthwise center line passing through a widthwise center of the each of the coolant-guide recessed grooves. Owing to this arrangement, the turbulence is unlikely to occur in the coolant flowing in the coolant-guide recessed grooves from the start end toward the terminal end. Therefore, the coolant flowing out of each of the coolant-guide recessed grooves through the terminal end is moved along the tapered outer circumferential surface of the connecting portion toward the blade portion, so that it is possible to supply the coolant to the cutting edge of the blade portion at a sufficient rate so as to suppress progress of the cutting-edge wear and obtain the cutting efficiency.

Further, preferably, a part of the shank portion is to be fitted in a tool holding hole of a tool holder, and the groove-depth regional-change position is to be positioned inside the tool holding hole. Owing to this arrangement, on the downstream side of the groove-depth regional-change position in each of the coolant-guide recessed grooves, the coolant flowing in the each of the coolant-guide recessed grooves forms the laminar flow having the flat cross section whose thickness in the radial direction of the rotary cutting tool is limited, so that the coolant flowing out of each of the coolant-guide recessed grooves through the terminal end is moved along the tapered outer circumferential surface of the connecting portion toward the blade portion, thereby making it possible to supply the coolant to the cutting edge of the blade portion at a sufficient rate and accordingly to suppress progress of the cutting-edge wear and obtain the cutting efficiency.

MODES FOR CARRYING OUT THE INVENTION

Hereinafter, some embodiments of the present invention will be described in detail with reference to the accompanying drawings. It is noted that, in the embodiments described below, the drawings are simplified or deformed, as needed, for convenience of description, and each portion is not necessarily precisely depicted in terms of dimension ratio, shape, etc.

Embodiment 1

Figure 1:
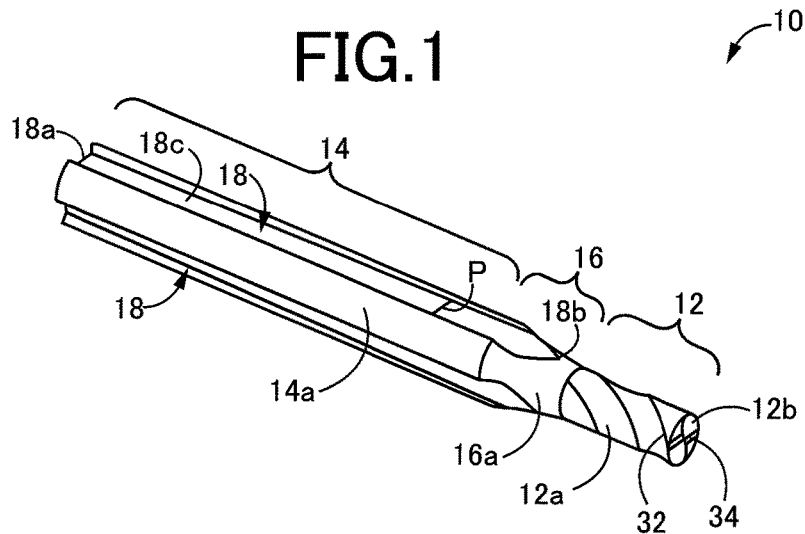
FIG. 1 is a perspective view showing a rotary cutting tool according to an embodiment of the present invention.

FIG. 1 shows a rotary cutting tool 10 according to an embodiment of the present invention. The rotary cutting tool 10 is made by cutting a single material such as tool steel or cemented carbide, and includes a blade portion 12 including a cutting edge provided therein, a cylindrical-shaped shank portion 14 having a diameter larger than a diameter of the blade portion 12, and a connecting portion 16 having a tapered outer circumferential surface 16a and connecting the blade portion 12 and the shank portion 14, such that the blade portion 12, the shank portion 14 and the connecting portion 16 are integral with one another. The blade portion 12 includes a peripheral cutting-edge portion 32 provided in an outer circumferential surface 12a of the blade portion 12 and an end cutting-edge portion 34 provided in an end surface 12b of the blade portion 12. That is, the blade portion 12 is to be used as an endmill or a thread mill, for example. In the drawings except FIG. 1, the blade portion 12 is represented by a cylindrical-shaped rotational trajectory of the peripheral cutting-edge portion 32 and the end cutting-edge portion 34. It is possible to interpret that the peripheral cutting-edge portion 32 and the end cutting-edge portion 34 cooperate with each other to constitute the above-described cutting edge provided in the blade portion 12, namely, the peripheral cutting-edge portion 32 and the end cutting-edge portion 34 are included in the cutting edge provided in the blade portion 12.

Figure 2:
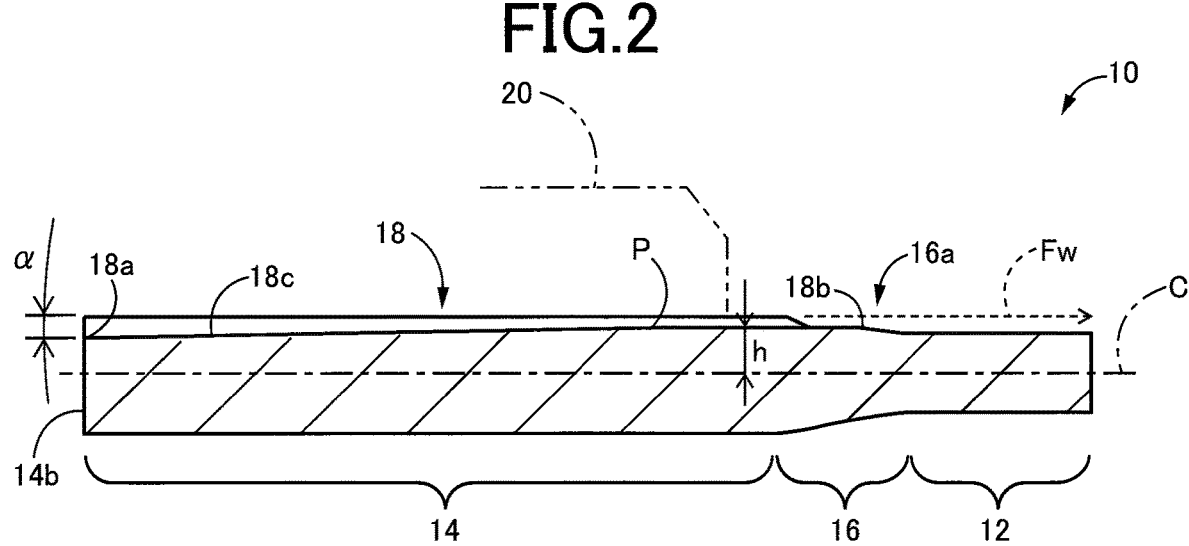
FIG. 2 is a cross sectional view showing the rotary cutting tool of FIG. 1.
Figure 3:
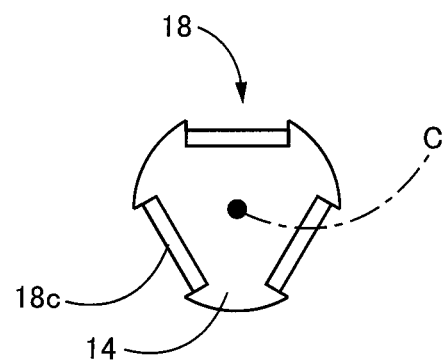
FIG. 3 is a view showing an end surface of the rotary cutting tool of FIG. 1, as seen from a side of a shank portion of the rotary cutting tool.
Figure 4:
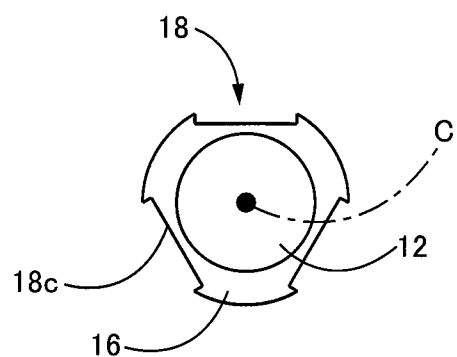
FIG. 4 is a view showing an end surface of the rotary cutting tool of FIG. 1, as seen from a side of a blade portion of the rotary cutting tool.
Figure 5:
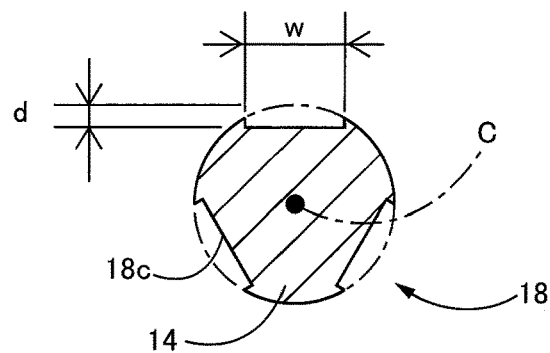
FIG. 5 is a view showing a transverse cross section of the rotary cutting tool of FIG. 1, wherein the transverse cross section is taken in the vicinity of a groove-depth regional-change position in the shank portion.

FIG. 2 shows a cross section containing a rotary axis C of the rotary cutting tool 10. FIG. 3 shows a left-side end surface of the rotary cutting tool 10 of FIG. 2, i.e., an end surface of the rotary cutting tool 10, as seen from a side of the shank portion 14. FIG. 4 shows a right-side end surface of the rotary cutting tool 10 of FIG. 2, i.e., an end surface of the rotary cutting tool 10, as seen from a side of the blade portion 12. FIG. 5 is a view showing a transverse cross section taken in the vicinity of a groove-depth regional-change position P in the shank portion 14.

As shown in FIGS. 2-5, the shank portion 14 includes a plurality of coolant-guide recessed grooves 18 (three coolant-guide recessed grooves 18 in the present embodiment) which are provided in its outer circumferential surface 14a and which are spaced apart from each other at a constant interval in a circumferential direction of the shank portion 14, such that a start end 18a of each of the coolant-guide recessed grooves 18 is located in an end surface 14b of the shank portion 14, and such that a terminal end 18b of each of the coolant-guide recessed grooves 18 is located in the tapered outer circumferential surface 16a of the connecting portion 16. Each of the coolant-guide recessed grooves 18 has a flat groove cross section such that a groove width w of each of the coolant-guide recessed grooves 18 is larger than a groove depth d of each of the coolant-guide recessed grooves 18. The groove depth d is a dimension of each of the coolant-guide recessed grooves 18, which is measured in a radial direction of the outer circumferential surface 14a of the shank portion 14, wherein the radial direction passes through a widthwise center of the each of the coolant-guide recessed grooves 18. The groove width w is a dimension of each of the coolant-guide recessed grooves 18, which is measured in a direction orthogonal to the above-described radial direction passing through the widthwise center of the each of the coolant-guide recessed grooves 18.

The groove width w of each of the plurality of coolant-guide recessed grooves 18 is constant from the start end 18a to the terminal end 18b. The plurality of coolant-guide recessed grooves 18 cooperate with one another to occupy 50% or less of the outer circumferential surface 14a of the shank portion 14. The number of the plurality of coolant-guide recessed grooves 18 may be any number from three to six.

Each of the coolant-guide recessed grooves 18 has a groove bottom shape such that the groove depth d is reduced as the each of the coolant-guide recessed grooves 18 extends from the start end 18a toward the groove-depth regional-change position P in which a tendency of change of a groove depth of a groove bottom 18c is changed, namely, such that a distance h from the rotary axis C to the groove bottom 18c is increased as the each of the coolant-guide recessed grooves 18 extends from the start end 18a toward the groove-depth regional-change position P. The groove-depth regional-change position P is a position in which an inclination angle of the groove bottom 18c of each of the coolant-guide recessed grooves 18 is regionally changed, for example, from a positive value (positive gradient) to zero (flat with zero gradient), or from a positive value to a negative value (negative gradient). That is, the groove-depth regional-change position P is the position in which the groove bottom 18c has a polyline shape.

Further, each of the coolant-guide recessed grooves 18 has the groove bottom shape such that the distance h from the rotary axis C to the groove bottom 18c is constant as the each of the coolant-guide recessed grooves 18 extends from the groove-depth regional-change position P to the terminal end 18b. The groove bottom 18c of each of the coolant-guide recessed grooves 18 has an inclined surface extending from the start end 18a to the groove-depth regional-change position P and a flat surface extending from the groove-depth regional-change position P to the terminal end 18b, wherein the inclined surface is inclined with respect to the rotary axis C by an inclination angle α, for example, and the flat surface is inclined with respect to the rotary axis C by an inclination angle of zero, for example.

Figure 6:
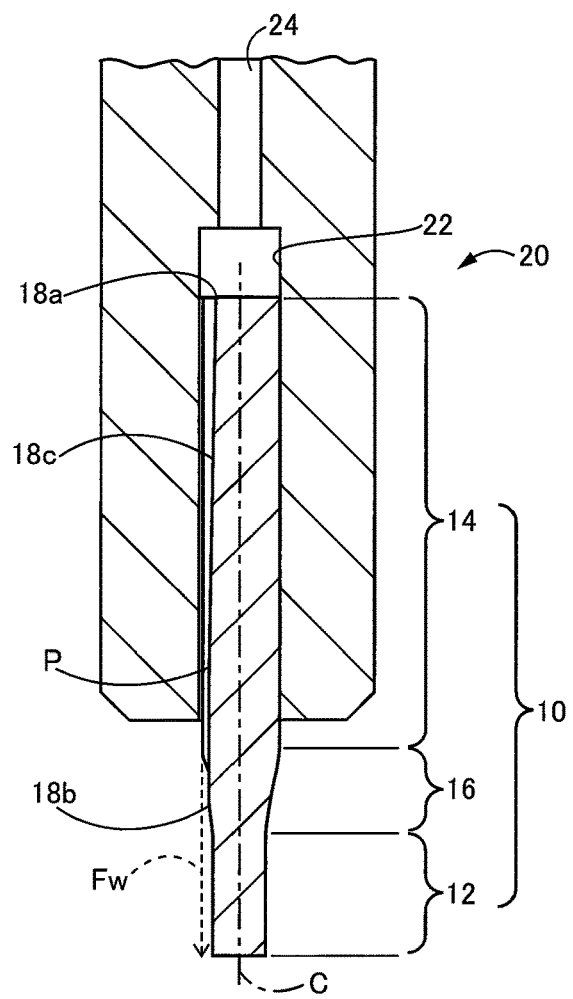
FIG. 6 is a view explaining a state in which the rotary cutting tool of FIG. 1 is attached to a tool holder.

FIG. 6 is a view showing a state in which the shank portion 14 of the rotary cutting tool 10 is fitted in a tool holding hole 22 of a tool holder 20, when a cutting operation is to be performed. The tool holder 20 is attached to a spindle of a machine tool (not shown), and a coolant is to be supplied into the tool holding hole 22 of the tool holder 20 through a coolant passage 24 that axially passes through the spindle and the tool holder 20. In the state in which the shank portion 14 is fitted in the tool holding hole 22 of the tool holder 20, a part of the shank portion 14, which is on a side of the connecting portion 16, is exposed, such that the groove-depth regional-change position P is positioned inside the tool holding hole 22. In the state in which the shank portion 14 is fitted in the tool holding hole 22 of the tool holder 20, the coolant is to be supplied into the tool holding hole 22 of the tool holder 20 through the coolant passage 24, and is then to be supplied to the cutting edge of the blade portion 12 through the coolant-guide recessed grooves 18 provided in the shank portion 14.

The coolant, which is caused to flow into each of the coolant-guide recessed grooves 18 through the start end 18a, is caused to flow in the each of the coolant-guide recessed grooves 18 having the constant width. A rate of flow of the coolant is increased owing to reduction of a flow cross-sectional area of each of the coolant-guide recessed grooves 18, until the coolant reaches the groove-depth regional-change position P, and then is substantially constant after the coolant passes through the groove-depth regional-change position P and when the coolant flows out of each of the coolant-guide recessed grooves 18 through the terminal end 18b. The coolant flowing out of each of the coolant-guide recessed grooves 18 through the terminal end 18b is drawn toward the rotary axis C owing to its viscosity and surface tension, so that the coolant is moved, against a centrifugal force, along the tapered outer circumferential surface 16a of the connecting portion 16, so as to reach the blade portion 12, whereby the coolant is supplied to the peripheral cutting-edge portion 32 and the end cutting-edge portion 34 of the blade portion 12. Further, on a downstream side of the groove-depth regional-change position P in each of the coolant-guide recessed grooves 18, the coolant forms a laminar flow having a flat cross section whose thickness in a radial direction of the blade portion 12 is limited. The coolant flows out of each of the coolant-guide recessed grooves 18 through the terminal end 18b, while forming such a laminar flow, so that the coolant is moved along the tapered outer circumferential surface 16a and reaches the blade portion 12, so as to be supplied to the peripheral cutting-edge portion 32 and the end cutting-edge portion 34 of the blade portion 12. In each of FIGS. 2 and 6, arrow Fw indicated by broken line schematically represents the flow of the coolant.

As described above, in the rotary cutting tool 10 of the present embodiment, the shank portion 14 includes the three coolant-guide recessed grooves 18 which are provided in the outer circumferential surface 14a of the shank portion 14 and which are circumferentially spaced apart from each other, such that the start end 18a of each of the coolant-guide recessed grooves 18 is located in the end surface 14b of the shank portion 14, and such that the terminal end 18b of each of the coolant-guide recessed grooves 18 is located in the tapered outer circumferential surface 16a of the connecting portion 16, wherein each of the coolant-guide recessed grooves 18 has the flat groove cross section such that the groove width w is larger than the groove depth d, and wherein each of the coolant-guide recessed grooves 18 is configured to guide the coolant from the shank portion 14 to the connecting portion 16. As compared with a case in which a coolant guide hole is provided to pass through the shank portion 14, it is possible to supply the coolant at a sufficient rate so as to suppress progress of cutting-edge wear of the blade portion 12 and obtain cutting efficiency, without considerably increasing the diameter of the shank portion 14 and without considerably reducing rigidity of the shank portion 14.

In the rotary cutting tool 10 of the present embodiment, the blade portion 12 serves as a known endmill or thread mill, and includes the peripheral cutting-edge portion 32 provided in the outer circumferential surface of the blade portion 12 and the end cutting-edge portion 34 provided in the end surface of the blade portion 12. Owing to this arrangement, the coolant flowing out of each of the coolant-guide recessed grooves 18 through the terminal end 18b is moved along the tapered outer circumferential surface 16a of the connecting portion 16 toward the peripheral cutting-edge portion 32 and the end cutting-edge portion 34 of the blade portion 12, so that it is possible to supply the coolant to the peripheral cutting-edge portion 32 and the end cutting-edge portion 34 at a sufficient rate so as to suppress progress of the cutting-edge wear and obtain the cutting efficiency.

In the rotary cutting tool 10 of the present embodiment, the groove width w of each of the coolant-guide recessed grooves 18 is constant, and the coolant-guide recessed grooves 18 are provided to occupy 50% or less of the outer circumferential surface 14a of the shank portion 14. Since each of the coolant-guide recessed grooves 18 has the constant groove width w, a turbulence is unlikely to occur in the coolant that is guided by the coolant-guide recessed grooves 18. Therefore, the coolant flowing out of each of the coolant-guide recessed grooves 18 through the terminal end 18b is moved along the tapered outer circumferential surface 16a of the connecting portion 16 toward the peripheral cutting-edge portion 32 and the end cutting-edge portion 34 of the blade portion 12, so that it is possible to supply the coolant to the blade portion 12 at a sufficient rate so as to suppress progress of the cutting-edge wear and obtain the cutting efficiency. Further, since the coolant-guide recessed grooves 18 are provided to occupy 50% or less of the outer circumferential surface 14a of the shank portion 14, the rigidity of the shank portion 14 is not reduced to such a degree that reduces practicability.

In the rotary cutting tool 10 of the present embodiment, the plurality of coolant-guide recessed grooves 18 consist of three, four, five or six coolant-guide recessed grooves 18. Owing to this arrangement, it is possible to suppress reduction in centering accuracy of the rotary cutting tool 10 and reduction in the rigidity of the shank portion 14. If the number of the coolant-guide recessed grooves 18 is not larger than two, the centering accuracy of the rotary cutting tool 10 would be reduced. If the number of the coolant-guide recessed grooves 18 is not smaller than seven, resistance to flow of the coolant would be increased thereby making it impossible to supply the coolant at a sufficient rate.

In the rotary cutting tool 10 of the present embodiment, each of the coolant-guide recessed grooves 18 has the groove bottom shape such that the groove depth d is reduced, namely, the distance h from the rotary axis C is increased, as the each of the coolant-guide recessed grooves 18 extends from the start end 18a toward the groove-depth regional-change position P in which the tendency of change of the groove depth d is changed. That is, on the downstream side of the groove-depth regional-change position P in each of the coolant-guide recessed grooves 18, the coolant flowing in the each of the coolant-guide recessed grooves 18 forms the laminar flow having the flat cross section whose thickness in the radial direction of the blade portion 12 is limited, so that the coolant flowing out of each of the coolant-guide recessed grooves 18 through the terminal end 18b is moved along the tapered outer circumferential surface 16a of the connecting portion 16 toward the blade portion 12, thereby making it possible to supply the coolant to the cutting edge of the blade portion 12 at a sufficient rate and accordingly to suppress progress of the cutting-edge wear and obtain the cutting efficiency.

In the rotary cutting tool 10 of the present embodiment, a surface of the groove bottom 18c of each of the coolant-guide recessed grooves 18 has a polyline shape in the groove-depth regional-change position P. Owing to this arrangement, the turbulence is unlikely to occur in the coolant flowing in the coolant-guide recessed grooves 18 when the coolant passes through the groove-depth regional-change position P. Therefore, the coolant flowing out of each of the coolant-guide recessed grooves 18 through the terminal end 18b is moved along the tapered outer circumferential surface 16a of the connecting portion 16 toward the blade portion 12, so that it is possible to supply the coolant to the cutting edge of the blade portion 12 at a sufficient rate so as to suppress progress of the cutting-edge wear and obtain the cutting efficiency.

In the rotary cutting tool 10 of the present embodiment, the distance h from the rotary axis C of the rotary cutting tool 10 to the groove bottom 18c of each of the coolant-guide recessed grooves 18 is constant, as the each of the coolant-guide recessed grooves 18 extends from the groove-depth regional-change position P toward the terminal end 18b. Owing to this arrangement, the turbulence is unlikely to occur in the coolant in the coolant-guide recessed grooves 18 when the coolant flows from the groove-depth regional-change position P toward the terminal end 18b. Therefore, the coolant flowing out of each of the coolant-guide recessed grooves 18 through the terminal end 18b is moved along the tapered outer circumferential surface 16a of the connecting portion 16 toward the blade portion 12, so that it is possible to supply the coolant to the cutting edge of the blade portion 12 at a sufficient rate so as to suppress progress of the cutting-edge wear and obtain the cutting efficiency.

In the rotary cutting tool 10 of the present embodiment, the groove bottom 18c of each of the coolant-guide recessed grooves 18 in at least its portion ranging from the start end 18a to the groove-depth regional-change position P, has a straight-line shape having a constant gradient. Owing to this arrangement, the turbulence is unlikely to occur in the coolant flowing in the coolant-guide recessed grooves 18 from the start end 18a toward the terminal end 18b. Therefore, the coolant flowing out of each of the coolant-guide recessed grooves 18 through the terminal end 18b is moved along the tapered outer circumferential surface 16a of the connecting portion 16 toward the blade portion 12, so that it is possible to supply the coolant to the cutting edge of the blade portion 12 at a sufficient rate so as to suppress progress of the cutting-edge wear and obtain the cutting efficiency.

In the rotary cutting tool 10 of the present embodiment, a part of the shank portion 14 is to be fitted in the tool holding hole 22 of the tool holder 20, and the groove-depth regional-change position P is to be positioned inside the tool holding hole 22. Owing to this arrangement, on the downstream side of the groove-depth regional-change position P in each of the coolant-guide recessed grooves 18, the coolant flowing in the each of the coolant-guide recessed grooves 18 forms the laminar flow having the flat cross section whose thickness in the radial direction of the rotary cutting tool 10 is limited, so that the coolant flowing out of each of the coolant-guide recessed grooves 18 through the terminal end 18b is moved along the tapered outer circumferential surface 16a of the connecting portion 16 toward the blade portion 12, thereby making it possible to supply the coolant to the cutting edge of the blade portion 12 at a sufficient rate and accordingly to suppress progress of the cutting-edge wear and obtain the cutting efficiency.

Embodiment 2

There will be described other embodiments of this invention. The same reference signs as used in the above-described embodiment will be used in the following embodiments, to identify the practically corresponding elements, and descriptions thereof are not provided.

Figure 7:
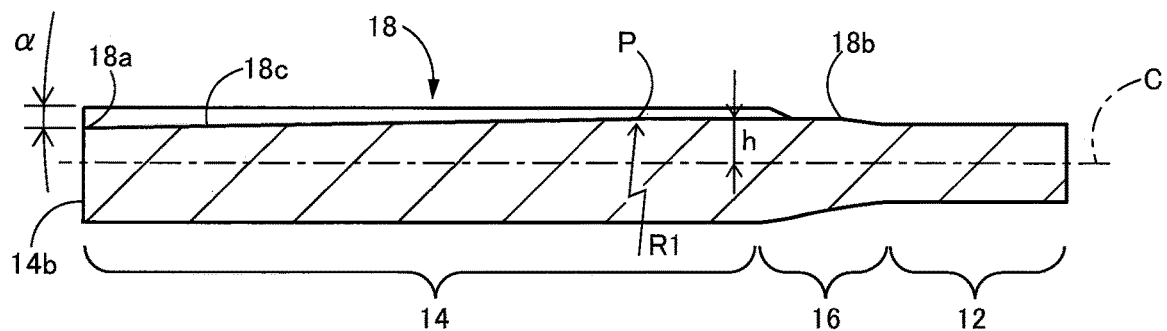
FIG. 7 is a view corresponding to the view of FIG. 2 and showing a longitudinal cross section of a rotary cutting tool according to another embodiment of the present invention.

FIG. 7 is a view corresponding to the view of FIG. 2 and showing a cross section of a rotary cutting tool 50 according to another embodiment of the present invention. As shown in FIG. 7, the rotary cutting tool 50 is substantially the same as the rotary cutting tool 10, although being different from the rotary cutting tool 10 in that the groove bottom 18c of each of the coolant-guide recessed grooves 18 has an arc shape, rather than the polyline shape, in the groove-depth regional-change position, wherein the arc shape has a predetermined radius R1 of curvature.

In the rotary cutting tool 50 according to this embodiment, the groove bottom 18c of each of the coolant-guide recessed grooves 18 has the arc shape that has the predetermined radius R1 of curvature, in the groove-depth regional-change position P. Owing to this arrangement, the turbulence is unlikely to occur in the coolant flowing in the coolant-guide recessed grooves 18 when the coolant passes through the groove-depth regional-change position P. Therefore, the coolant flowing out of each of the coolant-guide recessed grooves 18 through the terminal end 18b is moved along the tapered outer circumferential surface 16a of the connecting portion 16 toward the blade portion 12, so that it is possible to supply the coolant to the cutting edge of the blade portion 12 at a sufficient rate so as to suppress progress of the cutting-edge wear and obtain the cutting efficiency.

Embodiment 3

Figure 8:
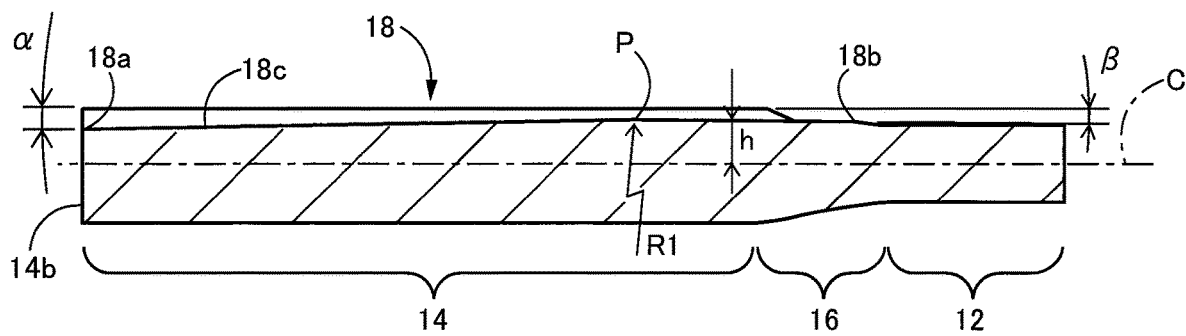
FIG. 8 is a view corresponding to the view of FIG. 2 and showing a longitudinal cross section of a rotary cutting tool according to still another embodiment of the present invention.

FIG. 8 is a view corresponding to the view of FIG. 2 and showing a cross section of a rotary cutting tool 60 according to another embodiment of the present invention. As shown in FIG. 8, the rotary cutting tool 60 is substantially the same as the rotary cutting tool 10, although being different from the rotary cutting tool 10 in that the groove bottom 18c of each of the coolant-guide recessed grooves 18 has an arc shape, rather than the polyline shape, in the groove-depth regional-change position P, wherein the arc shape has a predetermined radius R1 of curvature, and in that each of the coolant-guide recessed grooves 18 has a groove bottom shape such that the distance h from the rotary axis C is gradually reduced from the groove-depth regional-change position P to the terminal end 18b (namely, the groove bottom 18c of each of the coolant-guide recessed grooves 18 has an inclined surface extending from the groove-depth regional-change position P to the terminal end 18b, wherein the inclined surface has a gradient of a negative inclination angle β).

Figure 9:
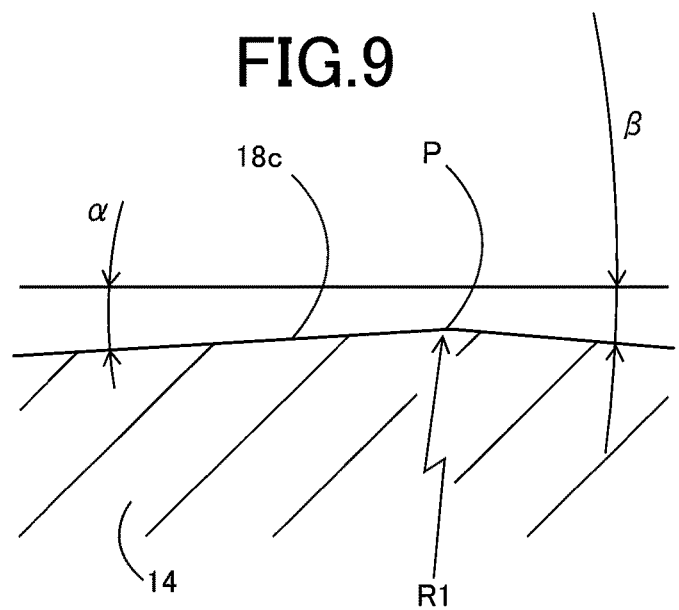
FIG. 9 is a view showing, in enlargement, a portion of the rotary cutting tool of FIG. 8, wherein the portion is in the vicinity of the groove-depth regional-change position.

FIG. 9 is a view showing, in enlargement, a portion of the rotary cutting tool 60 of FIG. 8, wherein the portion is in the vicinity of the groove-depth regional-change position P. The groove bottom 18c of each of the coolant-guide recessed grooves 18 regionally defines an arc having the predetermined radius R1 of curvature in the groove-depth regional-change position P which is provided in the shank portion 14 and in which the groove depth of each of the coolant-guide recessed grooves 18 is regionally changed.

In the rotary cutting tool 60 according to the present embodiment, the groove bottom 18c of each of the coolant-guide recessed grooves 18 has an inclined surface extending from the start end 18a to the groove-depth regional-change position P and another inclined surface extending from the groove-depth regional-change position P to the terminal end 18b, wherein the inclined surface is inclined with respect to the rotary axis C by the inclination angle α, for example, and the other inclined surface is inclined with respect to the rotary axis C by a negative inclination angle β, for example.

In the rotary cutting tool 60 according to the present embodiment, the distance h of the groove bottom 18c from the rotary axis C of the rotary cutting tool 60 is gradually reduced as each of the coolant-guide recessed grooves 18 extends from groove-depth regional-change position P to the terminal end 18b. Owing to this arrangement, the turbulence is unlikely to occur in the coolant in the coolant-guide recessed grooves 18 when the coolant flows from the groove-depth regional-change position P toward the terminal end 18b. Therefore, the coolant flowing out of each of the coolant-guide recessed grooves 18 through the terminal end 18b is moved along the tapered outer circumferential surface 16a of the connecting portion 16 toward the blade portion 12, so that it is possible to supply the coolant to the cutting edge of the blade portion 12 at a sufficient rate so as to suppress progress of the cutting-edge wear and obtain the cutting efficiency.

Embodiment 4

Figure 10:
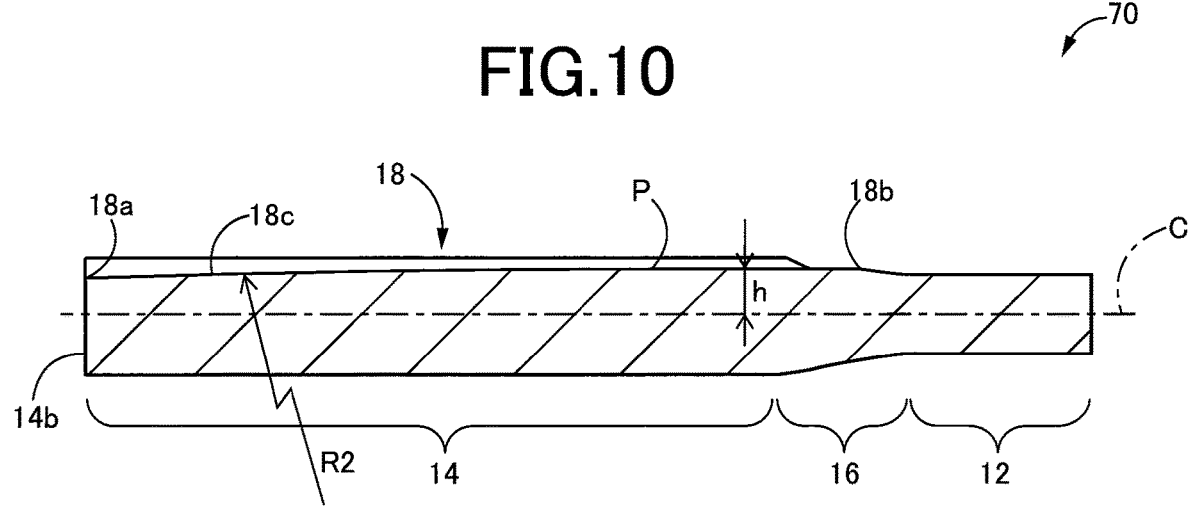
FIG. 10 is a view corresponding to the view of FIG. 2 and showing a longitudinal cross section of a rotary cutting tool according to still another embodiment of the present invention.

FIG. 10 is a view corresponding to the view of FIG. 2 and showing a cross section of a rotary cutting tool 70 according to another embodiment of the present invention. FIG. 10 shows a plane containing the rotary axis C of the rotary cutting tool 70 and a widthwise center line passing through a widthwise center of one of the coolant-guide recessed grooves 18. The rotary cutting tool 70 is different from the rotary cutting tool 10 in that the groove bottom 18c of each of the coolant-guide recessed grooves 18 has an arc shape that has a predetermined radius R2 of curvature whose center lies on the above-described plane wherein the predetermined radius R2 of curvature is sufficiently larger than the above-described predetermined radius R1 of curvature such that the distance h of the groove bottom 18c is gradually increased as each of the coolant-guide recessed grooves 18 extends from the start end 18a toward the groove-depth regional-change position P.

In the rotary cutting tool 70 according to the present embodiment, the groove bottom 18c of each of the coolant-guide recessed grooves 18 in at least its portion ranging from the start end 18a to the groove-depth regional-change position P, has the arc shape that has the predetermined radius R2 of curvature whose center lies on the plane containing the rotary axis C of the rotary cutting tool 70 and the widthwise center line passing through the widthwise center of the each of the coolant-guide recessed grooves 18. Owing to this arrangement, the turbulence is unlikely to occur in the coolant flowing in the coolant-guide recessed grooves 18 from the start end 18a toward the terminal end 18b. Therefore, the coolant flowing out of each of the coolant-guide recessed grooves 18 through the terminal end 18b is moved along the tapered outer circumferential surface 16a of the connecting portion 16 toward the blade portion 12, so that it is possible to supply the coolant to the cutting edge of the blade portion 12 at a sufficient rate so as to suppress progress of the cutting-edge wear and obtain the cutting efficiency.

Embodiment 5

Figure 11:
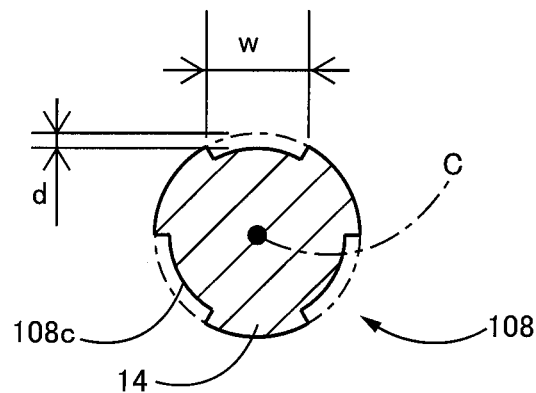
FIG. 11 is a view showing a transverse cross section of a rotary cutting tool according to still another embodiment of the present invention, wherein the transverse cross section is taken in the vicinity of the groove-depth regional-change position in the shank portion.

FIG. 11 is a view corresponding to the view of FIG. 3 and showing a cross section of coolant-guide recessed grooves 108 provided in the shank portion 14 in another embodiment of the present invention, wherein the cross section is orthogonal to the rotary axis C. The coolant-guide recessed grooves 108 shown in FIG. 11 are different from the coolant-guide recessed grooves 18 of FIG. 3 in each of which the groove bottom 18c has a straight line shape in a direction of the groove width w, in that a groove bottom 108c of each of the coolant-guide recessed grooves 108 is curved to have an arc shape whose center of curvature corresponds to the rotary axis C such that the groove depth d is constant in a direction of the groove width w (namely, in the circumferential direction). In the present embodiment, an oblateness f [=(w−d)/w] of the cross section of each of the coolant-guide recessed grooves 108 is 0.81. It is noted that an oblateness f of the cross section of each of coolant-guide recessed grooves 18 shown in FIG. 3 is 0.75.

Embodiment 6

Figure 12:
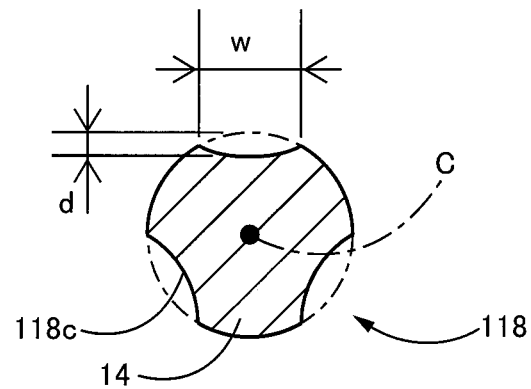
FIG. 12 is a view showing a transverse cross section of a rotary cutting tool according to still another embodiment of the present invention, wherein the transverse cross section is taken in the vicinity of the groove-depth regional-change position in the shank portion.

FIG. 12 is a view corresponding to the view of FIG. 3 and showing a cross section of coolant-guide recessed grooves 118 provided in the shank portion 14 in another embodiment of the present invention. The coolant-guide recessed grooves 118 shown in FIG. 12 are different from the coolant-guide recessed grooves 18 of FIG. 3 in each of which the groove bottom 18c has the straight line shape in the direction of the groove width w, in that a groove bottom 118c of each of the coolant-guide recessed grooves 118 is curved to have an arc shape whose center of curvature is located on a side opposite to the rotary axis C such that the groove depth d is increased as viewed from each of its opposite ends toward its center, in the direction of the groove width w (namely, in the circumferential direction). In the present embodiment, the oblateness f [=(w−d)/w] of the cross section of each of the coolant-guide recessed grooves 118 is 0.78.

While the embodiments of this invention have been described in detail by reference to the drawings, it is to be understood that the invention may be otherwise embodied.

For example, each of the coolant-guide recessed grooves 18 is provided with the groove-depth regional-change position P in which the groove depth is regionally changed. However, the groove-depth regional-change position P does not have to be necessarily provided in each of the coolant-guide recessed grooves 18. For example, the distance of the groove bottom 18c of each of the coolant-guide recessed grooves 18 from the rotary axis C may be constant from the start end 18a to the terminal end 18b.

Further, each of the rotary cutting tools 10, 50, 60, 70 of the above-described embodiments is provided with the three coolant-guide recessed grooves 18. However, the number of the coolant-guide recessed grooves 18 may be any of three, four, five and six.

Further, in the rotary cutting tool 60 of the above-described embodiment, the groove bottom 18c of each of the coolant-guide recessed grooves 18 has the inclined surface extending from the start end 18a to the groove-depth regional-change position P, wherein the inclined surface is inclined with respect to the rotary axis C, for example, by the inclination angle α. However, the inclination angle α may be zero, too.

Further, in each of the rotary cutting tools 10, 50, 60, 70 of the above-described embodiments, the diameter of the blade portion 12 is not larger than 10 mm, preferably not larger than 8 mm, more preferably from 0.05 mm to 4.0 mm, and the most preferably from 0.05 mm to 3.0 mm.

While the embodiments of the present invention have been described by reference to the accompanying drawings, it is to be understood that the invention is applicable to other forms in a range without departing from the spirit of the invention.

DESCRIPTION OF REFERENCE SIGNS 10, 50, 60, 70: rotary cutting tool 12: blade portion 12a: outer circumferential surface 12b: end surface 14: shank portion 14a: outer circumferential surface 14b: end surface 16: connecting portion 16a: tapered outer circumferential surface 18, 108, 118: coolant-guide recessed groove 18a: start end 18b: terminal end 18c, 108c, 118c: groove bottom 20: tool holder 22: tool holding hole 32: peripheral cutting-edge portion 34: end cutting-edge portion P: groove-depth regional-change position C: rotary axis d: groove depth w: groove width h: distance

The invention claimed is:

1. A rotary cutting tool comprising:
   a blade portion including a cutting edge provided in the blade portion;
   a shank portion having a diameter larger than a diameter of the blade portion; and
   a tapered connecting portion connecting the blade portion and the shank portion;
   wherein the shank portion includes a plurality of coolant-guide recessed grooves which are provided in an outer circumferential surface of the shank portion and which are circumferentially spaced apart from each other, such that a start end of each of the coolant-guide recessed grooves is located in an end surface of the shank portion, and such that a terminal end of each of the coolant-guide recessed grooves is located in a tapered outer circumferential surface of the connecting portion,
   wherein each of the coolant-guide recessed grooves has a groove cross section such that a groove width of each of the coolant-guide recessed grooves is larger than a groove depth of each of the coolant-guide recessed grooves, each of the coolant-guide recessed grooves being configured to guide a coolant from the shank portion to the connecting portion, and
   wherein each of the coolant-guide recessed grooves has a groove bottom that is shaped such that the groove depth is reduced as the each of the coolant-guide recessed grooves extends from the start end toward a groove-depth regional-change position in which a tendency of change of the groove depth is changed.

2. The rotary cutting tool according to claim 1, wherein the cutting edge provided in the blade portion includes a peripheral cutting-edge portion provided in an outer circumferential surface of the blade portion and an end cutting-edge portion provided in an end surface of the blade portion.

3. The rotary cutting tool according to claim 1, wherein the groove width of each of the coolant-guide recessed grooves is constant, and the coolant-guide recessed grooves are provided to occupy 50% or less of the outer circumferential surface of the shank portion.

4. The rotary cutting tool according to claim 3, wherein the plurality of coolant-guide recessed grooves consist of three, four, five or six coolant-guide recessed grooves.

5. The rotary cutting tool according to claim 1, wherein the groove bottom of each of the coolant-guide recessed grooves has a polyline shape or an arc shape that has a predetermined radius of curvature, in the groove-depth regional-change position.

6. The rotary cutting tool according to claim 1, wherein a distance from a rotary axis of the rotary cutting tool to the groove bottom of each of the coolant-guide recessed grooves is constant or gradually reduced, as the each of the coolant-guide recessed grooves extends from the groove-depth regional-change position toward the terminal end.

7. The rotary cutting tool according to claim 1, wherein the groove bottom of each of the coolant-guide recessed grooves in at least a portion thereof ranging from the start end to the groove-depth regional-change position, has a straight-line shape having a constant gradient, or has an arc shape that has a predetermined radius of curvature whose center lies on a plane containing a rotary axis of the rotary cutting tool and a widthwise center line passing through a widthwise center of the each of the coolant-guide recessed grooves.

8. The rotary cutting tool according to claim 1, wherein a part of the shank portion is to be fitted in a tool holding hole of a tool holder, and the groove-depth regional-change position is to be positioned inside the tool holding hole.

9. The rotary cutting tool according to claim 1,
   wherein each of the coolant-guide recessed grooves includes a depth reducing portion extending from the start end to the groove-depth regional-change position, such that the groove depth in the depth reducing portion is reduced in a direction away from the start end toward the groove-depth regional-change position, and
   wherein the groove width in the depth reducing portion is constant.

10. The rotary cutting tool according to claim 1, wherein the recessed grooves have zero depth at the terminal end.

11. The rotary cutting tool according to claim 1, wherein each of the coolant-guide recessed grooves has a cross-sectional area that is reduced as the each of the coolant-guide recessed grooves extends from the start end toward the groove-depth regional-change position.

* * * * *